US012780101B2

(12) United States Patent
Hasner

(10) Patent No.: US 12,780,101 B2
(45) Date of Patent: Nov. 3, 2026

(54) STAIR ENTRY AFTERMARKET ASSISTANCE DEVICE

(71) Applicant: Steve Hasner, Brooklyn Center, MN (US)

(72) Inventor: Steve Hasner, Brooklyn Center, MN (US)

( * ) Notice: Subject to any disclaimer, the term of this patent is extended or adjusted under 35 U.S.C. 154(b) by 320 days.

(21) Appl. No.: 18/537,149

(22) Filed: Dec. 12, 2023

(65) Prior Publication Data

US 2024/0190352 A1 Jun. 13, 2024

Related U.S. Application Data

(60) Provisional application No. 63/432,259, filed on Dec. 13, 2022.

(51) Int. Cl.
*B60R 3/00* (2006.01)

(52) U.S. Cl.
CPC .................................... *B60R 3/007* (2013.01)

(58) Field of Classification Search
CPC ........... B60R 3/007; B60R 3/002; B60R 3/02; B60R 3/00
See application file for complete search history.

(56) References Cited

U.S. PATENT DOCUMENTS 4,071,260 A * 1/1978 Marshall, Sr. ............ B60R 3/02 280/166
6,264,222 B1 * 7/2001 Johnston ................... B60R 3/02 182/127
11,584,302 B2 * 2/2023 Jackson ..................... B60R 3/02
11,851,025 B2 * 12/2023 Schneider ............... B60R 3/007
2009/0183946 A1 * 7/2009 Prebola ...................... E06C 5/04 182/127
2020/0062184 A1 * 2/2020 Miller ........................ B60R 3/02

* cited by examiner

*Primary Examiner* — John D Walters
(74) *Attorney, Agent, or Firm* — Westman, Champlin & Koehler, P.A.; Amanda M. Prose

(57) ABSTRACT

An aftermarket assistance device for use with a factory stair with a vertical space of about 18 inches between steps of the factory stair and comprising a foot hold surface and a mounting surface extending from connection with the foot hold surface wherein the foot hold surface has a surface area less than the surface area of either the steps of the factory stair and wherein the foot hold surface is mountable within the vertical space between the steps of the factory stair.

12 Claims, 7 Drawing Sheets

STAIR ENTRY AFTERMARKET ASSISTANCE DEVICE

BACKGROUND

The present invention relates to entry steps for access to a cab of a truck or a trailer and more specifically relates to an aftermarket step for reducing a user's step height into the cab or trailer.

Semi-trucks or big rigs have a cab portion that is generally positioned above the wheel base of the truck and thus, for example, the door to the cab is too high for a user to enter without assistance. Semi-trucks are then provided with access steps which include a bottom step and a top step to enable entry to the cab. In many large trucks these two steps are factory provided or otherwise provided as a two platform (step) stair for bolting to the external chassis of the cab. The stairs have a rise between steps of about 18 inches, meaning that a large step by a user must be taken to get into the truck. The reason for the extreme rise in the stair is because the stair must be steep to prevent the stairs from protruding outwardly from the cab in a manner that could obstruct traffic flow when the truck is being driven. Drivers do not have the time, nor is it practical to add a stair or ladder that is removable each time the driver enters or exits the cab. However, repeated climbing into a can of a truck positioned so high off the ground surface can cause knee and back pain over time.

SUMMARY

An aspect of the present disclosure relates to an aftermarket assistance device for mounting to an entry point of a vehicle comprising a first end and a second end with at least one vertical support member extending therebetween, wherein the first end comprises a first mounting surface for coupling to a first step and the second end comprises a second mounting surface for coupling to a second step and wherein the length of the vertical support member is in the range of about 12 to about 24 inches; and a foot hold surface positioned about halfway between the first end and second end.

In one or more embodiments, the foot hold surface, the first mounting surface, and/or the second mounting surface are configured to be bolted or welded to the vertical support member.

In one or more embodiments, the foot hold surface, the first mounting surface, and/or the second mounting surface are integrally formed with the vertical support member.

The assistance device comprises a first vertical support member and a second vertical support member, wherein the foot hold surface extends horizontally therebetween. The first vertical support member and the second vertical support member intersect at one end each thereof, thereby forming a corner.

The first mounting surface comprises one or more springs which frictionally engage the vertical support member with the first step.

The vertical support member comprises one or more bends such that the assistance device remains within a perimeter of a frame of a factory stair by not having a depth that exceeds an outer perimeter of the second step.

The assistance device is comprised of steel, aluminum, diamond plate steel, or combinations thereof.

The foot hold surface has a surface area that is less than half of a surface area of either the first or second step or both.

The foot hold surface has a surface area that is one-third or less than a surface area of the first or second step or both.

In one or more embodiments, the vehicle is a semi-truck, semi-trailer, truck, or trailer.

The assistance device is an assistance step.

Another aspect of the present disclosure relates to an aftermarket assistance device for mounting to an entry point of a vehicle comprising: a first vertical support member and a second vertical support member connected by a foot hold surface extending horizontally therebetween, wherein the first vertical support member connects to a first mounting surface configured for coupling to a step and the second vertical support member connects to a second mounting surface configured for coupling to the step, wherein a length of the first vertical support member is longer than a length of the second vertical support member.

The length of the first vertical support member is about 0.5 to 1 inch longer than the length of the second vertical support member.

The foot hold surface has a slope such that the foot hold surface is not parallel with the step.

The length of the first and second vertical support members are in the range of about 6 to 10 inches.

The step is an upper step such that the assistance device hangs below the upper step or the step is a lower step such that the assistance device extends above the lower step.

DETAILED DESCRIPTION

Figure 1:
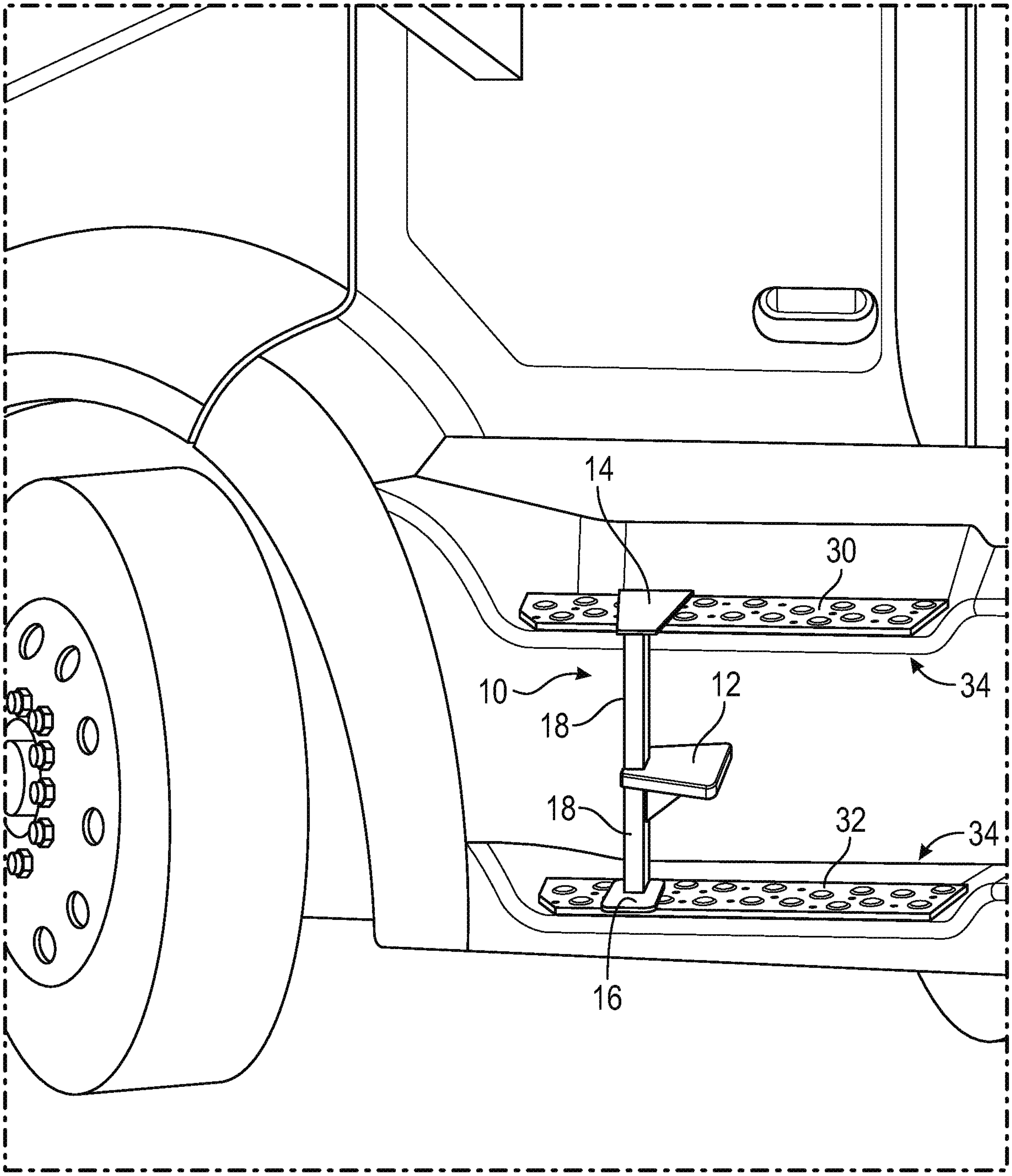
FIG. 1 is a perspective view of an assistance device according to one or more embodiments herein mounted to a factory stair for a truck or trailer.

An entry assistance device for mounting to a vehicle is described herein. The assistance device is mountable or otherwise positionable on or between the pre-existing or factory provided step or steps for entry to a cab of the vehicle. The vehicle may include a semi-truck or trailer. For example, generally two steps are provided for entry to the cab of a semi-truck or trailer by a driver. The entry assistance device described herein provides a surface that may act as a third step, the device is mountable between two adjacent steps for ease of entry into the cab.

The semi-truck or trailer cab steps are generally provided as a pair of parallel steps or platforms that are spaced apart. The steps may be spaced vertically by about 18 inches. In one or more embodiments, the assistance device is positionable and/or mountable for use at any location between two vertically spaced steps. This assistance device is a stable attachment that can be used to reduce the rise of a step, making it easier for a driver to enter the cab of the truck by adding an additional step in the 18-inch step space. That is, in one embodiment, a user can make one 18-inch step rise to enter the cab or can take two approximately 9-inch steps to enter the cab. While in one or more embodiments described herein the assistance device is mounted about halfway between the two steps provided on most semi-trucks, the step may be mounted at any height between the two vertically spaced steps.

In one or more embodiments, the assistance device is an aftermarket device for aftermarket installation. The assistance device may be removable such that a user installs the device for use and removes the device after use. Alternatively, the device may be secured to the factory stair such that it remains in place when in use and not in use.

The assistance device may be comprised of steel, aluminum, diamond plate steel, or like materials that are mountable in a secure manner to a factory stair and can withstand force and weight from a user supported on the assistance device repeatedly while also being able to withstand various elements such as rain, snow, high winds, etc.

An assistance device is mountable or otherwise provided in a space between an upper and lower step of a factory stair for truck or trailer entry and includes various mounting arrangements for securing the device to the factory stair.

The assistance device is mountable such that a foot hold surface is positioned between the upper and lower steps of the factory stair. The foot hold surface may be the same or smaller than the surface area of either the upper or lower step and thus in one or more embodiments does not add extraneous bulk to the stair. For example, the assistance device does not protrude outwardly from a frame of the factory stair further than the lower step. To provide a usable step the assistance device may protrude further than the upper step but remains within the overall perimeter of the frame of the factory stair by not having a depth that exceeds the outer perimeter of the lower step.

An entry assistance device comprises a foot hold surface and at least one mounting surface in connection with the foot hold surface which enables the mounting of the foot hold surface in the space between an upper and lower step on a factory stair for a truck or trailer where the upper and lower steps are generally vertically spaced apart by about 12 to 24 inches, and commonly about 18 inches.

A mounting surface is configured for coupling to a pre-existing step or factory step. The mounting surface may be securable to a factory step such that the mounting surface is fastened to and/or rests on and/or underneath the factory step. For example, the mounting surface may fit over the top of the factory step. Alternatively, the mounting surface may frictionally engage an underside of the factory step. The mounting surface may be one or more surfaces, plates, or pegs and may vary in size. For example, the mounting surface may be about 5×6 inches or 1×1 inches. In one or more embodiments, the mounting surface may be substantially flat and in others it may wrap around the factory step. The mounting surface may further comprise one or more apertures for securing the mounting surface to the factory step. Fastening and securing means can include various fixable methods such as fasteners, bolts, welding, or combinations thereof.

In one or more embodiments, the assistance device comprises a first mounting surface and a second mounting surface. For example, the first mounting surface may be configured for securing to an upper step on a factory stair and the second mounting surface may be configured for securing to a lower step. Alternatively, the first and second mounting surfaces may be securable to the same factory step.

The assistance device may further comprise one or more vertical support members. The one or more vertical support members support a foot hold surface and a mounting surface thereon. In one or more embodiments described herein, the one or more vertical support members support a first mounting surface, a second mounting surface, and a foot hold surface thereon. The one or more vertical support members may connect the first mounting surface to the foot hold surface and the second mounting surface to the foot hold surface. Additionally, or alternatively, the one or more vertical support members may connect the first mounting surface to the second mounting surface. The foot hold surface and mounting surface may be integrally formed with the one or more vertical support members and/or mountable to the one or more vertical support members by way of fasteners such as bolts, or by welding.

The one or more vertical support members may extend the length between an upper and lower step on a factory stair. However, the one or more vertical support members may have differing lengths. For example, a first vertical support member may extend the length between an upper and lower step of a factory stair while a second vertical support member extends the length between the foot hold surface and a factory step. In one or more embodiments comprising two or more vertical support members, the foot hold surface extends horizontally the space between the first vertical support member and the second vertical support member. For example, the foot hold surface may be about 4-6 inches in length and the vertical support members may be about 18-20 inches in length. The second mounting surface may also extend horizontally the space between the first vertical support member and the second vertical support member. One or more vertical support members may improve the integrity and stability of the assistance device.

In one or more embodiments, a vertical support member comprises one or more bends to provide an assistance device securable within the overall perimeter of the frame of the factory stair by not having a depth that exceeds the outer perimeter of the lower step. For example, a portion of the vertical support member that extends above the foot hold surface may extend inward, toward a vehicle, to avoid extending beyond the overall perimeter of the factory stair frame. Additionally, or alternatively, a lower portion of the vertical support member that extends below the foot hold surface may extend outward, away from the vehicle, to maintain integrity and stability of the assistance device. The mounting surface and foot hold surface may comprise different perimeter shapes. For example, the perimeter shapes may be generally triangular, rectangular, circular, or variations thereof. In one or more embodiments described herein, a first and second mounting surface may have different shapes and/or sizes to accommodate the size and shape of the factory steps and/or factory stair.

In one or more embodiments, the assistance device may have a first vertical support member and a second vertical support member. The vertical support members may have lengths that extend the distance between a first mounting surface and a second mounting surface. The vertical support members may each have a width such that the vertical support members intersect at one end each to form a corner. The foot hold surface then may extend the horizontal length between the two vertical support members that connect, thereby forming a corner. A corner formed by the intersection of a first and second vertical support member may make it easier to place a user's foot in/on the foot hold surface and prevent foot misplacement, tripping, and/or slipping. It may also improve the stability and integrity of the device.

In one or more embodiments, the assistance device is provided in an assembly that frictionally engages with an upper portion and a lower portion of the frame of the factory stair and/or an upper step and a lower step directly. In one or more embodiments, a mounting surface may comprise one or more springs or spring caps thereon. Springs and/or spring caps on the mounting surface may provide a tailored fit such that the assistance device is usable with factory stairs of different types and with different dimensions.

In another embodiment, the assistance device has a first vertical support member configured to engage with the upper step and the lower step, and a second vertical support member configured to engage with one of the upper or lower step. The foot hold surface may extend horizontally therebetween. The first vertical support member may comprise a spring and/or spring cap for securing to the upper step.

In one or more embodiments described herein, an assistance device is integrally formed and comprises a plurality of bends for defining a foot hold surface, a first mounting surface, and a second mounting surface. The assistance device may comprise a first bend for connecting the first mounting surface with a vertical support member and a second bend configured to connect the vertical support member with the foot hold surface. The assistance device may further comprise a third bend and fourth bend wherein the third bend is configured to connect the foot hold surface with a second vertical support member and the fourth bend is configured to connect the second vertical support member to a second mounting surface. The one or more bends may be about 90 degrees.

In one or more embodiments, the first mounting surface and second mounting surface are secured to the same factory step. The first and second mounting surfaces may be mounted on the factory step such that the foot hold surface is propped above or below the factory step. For example, the foot hold surface may extend approximately 5-9 inches from the factory step.

In one or more embodiments, the foot hold surface may be positioned at an angle such that the foot hold surface is not parallel with the factory step. For example, a first vertical support member may have a longer length than a second vertical support member such that the foot hold surface has a slope. Embodiments comprising an angled foot hold surface may make it easier for a user to use the assistance device. For example, it may be easier to place a user's foot on the foot hold surface, which may be smaller than the factory steps, if the foot hold surface is angled slightly toward a user. Moreover, an angled foot hold surface may prevent foot misplacement, tripping, and/or slipping.

In one or more embodiments, the first and second mounting surfaces have the same length as the foot hold surface such that the first mounting surface and the second mounting surface extend the entire length of the foot hold surface. For example, the foot hold surface, the first mounting surface, and the second mounting surface may all have a length of 5.5 inches. It is also contemplated that the first mounting surface and the second mounting surface have different dimensions. For example, the first and second mounting surfaces may be approximately 1×1 inches or 2×1 inches. The first and second mounting surfaces do not need to have the same dimensions. Moreover, the mounting surface may be situated anywhere along the length of the foot hold surface. The first and second mounting surfaces may be situated at the same position or different positions along the length of the foot hold surface.

It is also contemplated that in one or more embodiments, a foot hold surface is connectable to a factory step by a single mounting surface. In one or more embodiments, the mounting surface wraps around an edge of the factory step and comprises two or more apertures therein such that one or more bolts may extend through the mounting surface on a top and bottom side of the factory step. Again, the assistance device may be secured by various fixable methods such as fasteners, bolts, welding, or combinations thereof.

It is also contemplated that in one or more embodiments, an assistance device is integrally formed with an upper step or lower step and hangs or extends therefrom.

An entry assistance device 10 is illustrated in FIGS. 1-6. The assistance device 10 comprises a foot hold surface 12 connectable to a first mounting surface 14 and a second mounting surface 16. Referring to FIGS. 1-4, the first mounting surface 14 is securable to an upper step 30 of a factory stair 34 such that the first mounting surface 14 is fastened to and/or rests on and/or underneath the upper step 30. Additionally, the second mounting surface 16 secures to a lower step 32 such that the second mounting surface 16 is fastened to or rests on the lower step 32. The foot hold surface 12 is positioned about halfway between the upper step 30 and lower step 32 on the factory stair 34. Referring to FIGS. 5-6, the first mounting surface 14 and the second mounting surface 16 are securable to the same factory step. For example, either the upper step 30 or lower step 32.

Referring to FIG. 1, the assistance device 10 comprises a first mounting surface 14 and a second mounting surface 16 with a vertical support member 18 extending therebetween. The vertical support member 18 supports a foot hold surface 12 thereon such that the foot hold surface 12 is suspended anywhere along the length of the vertical support member 18 that extends the length between an upper step 30 and lower step 32 on a factory stair 34.

Figure 2:
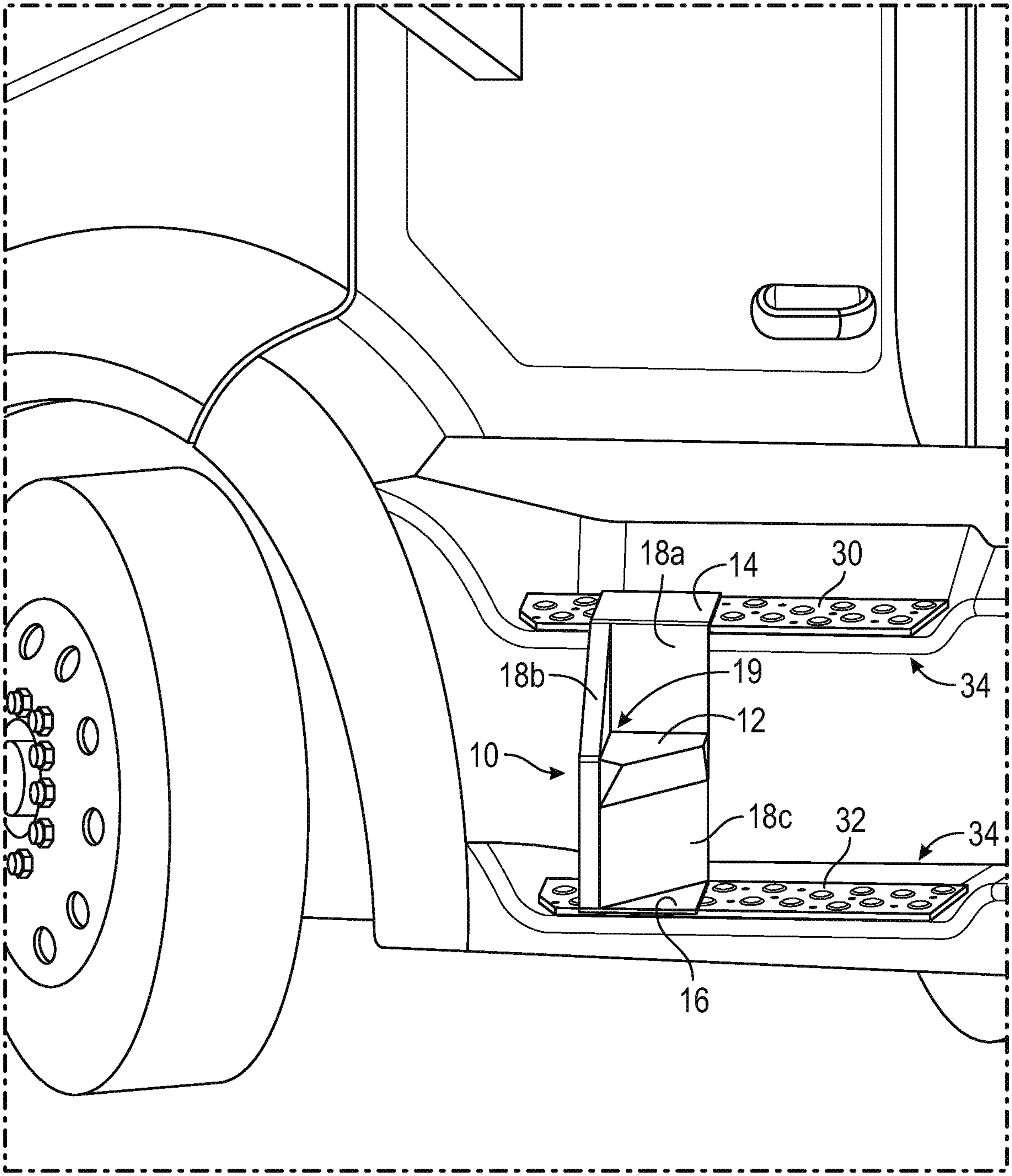
FIG. 2 is a perspective view of an assistance device according to one or more embodiments herein mounted to a factory stair for a truck or trailer.

Referring to FIGS. 2-6, the assistance device 10 comprises a first vertical support member 18*a* and a second vertical support member 18*b*. The first vertical support member 18*a* and the second vertical support member 18*b* are connected by a foot hold surface 12, extending horizontally the space therebetween. Referring to FIG. 2, the device 10 further comprises a third vertical support member 18*c* extending from the foot hold surface 12 to the second mounting surface 16. The second mounting surface 16 also extends horizontally the space between the first vertical support member 18*a* and the second vertical support member 18*b*.

In one or more embodiments as illustrated in FIG. 2, the first vertical support member 18*a* abuts a side of a vehicle and has a length extending the space between an upper step 30 and lower step 32 of a factory stair 34 and a width that is perpendicular the second vertical support member 18*b*. The second vertical support member 18*b* intersects the first vertical support member 18*a* thereby forming a corner 19. The second vertical support member 18*b* has a length that extends the space between the upper step 30 and lower step 32 of the factory stair 34 and a tapered width such that the assistance device 10 stays within the overall perimeter of the frame of the factory stair 34 by not having a depth that exceeds the outer perimeter of the lower step 32.

Figure 3A:
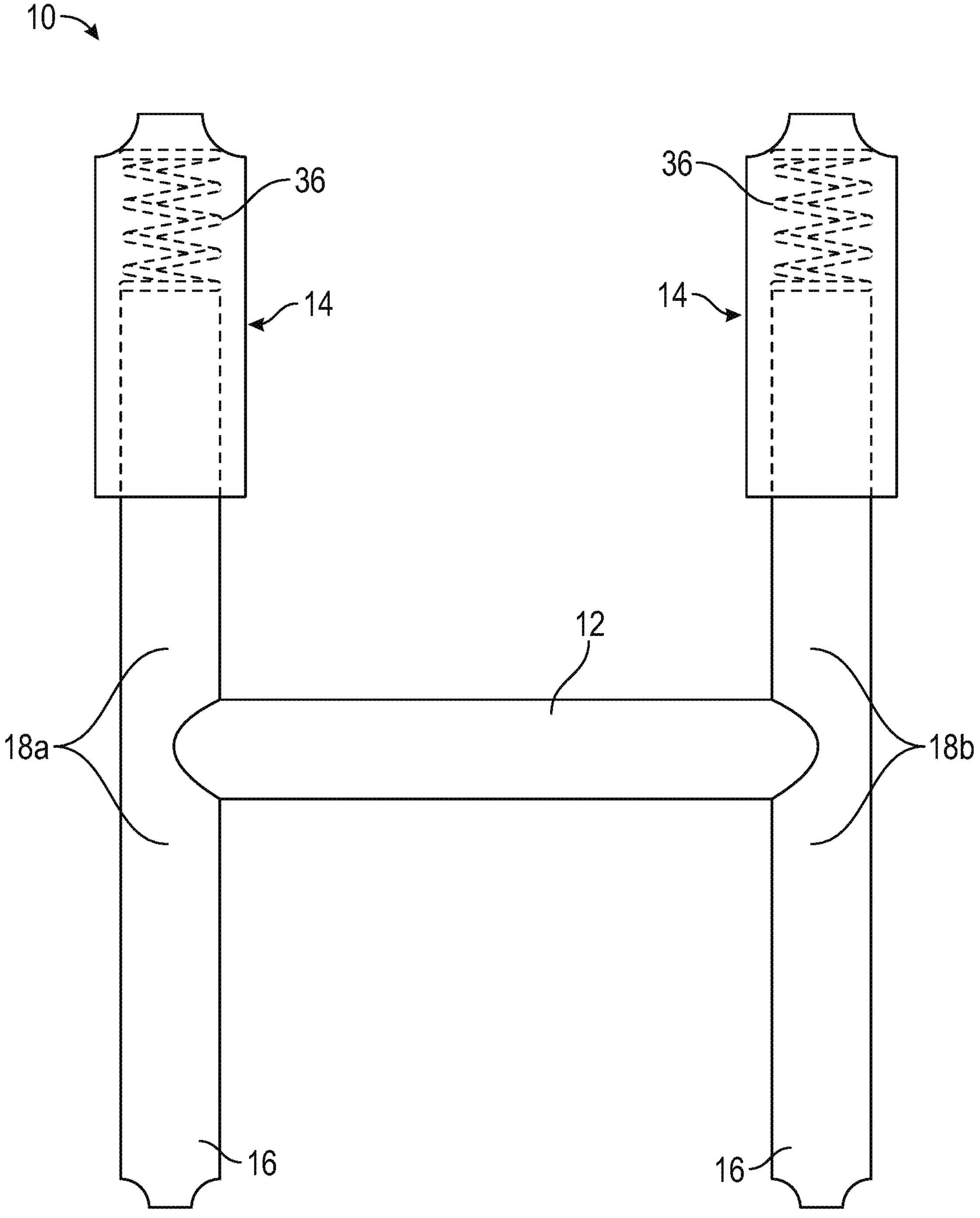
FIG. 3A is a front view of an assistance device according to one or more embodiments herein for mounting to a factory stair for a truck or trailer.
Figure 3B:
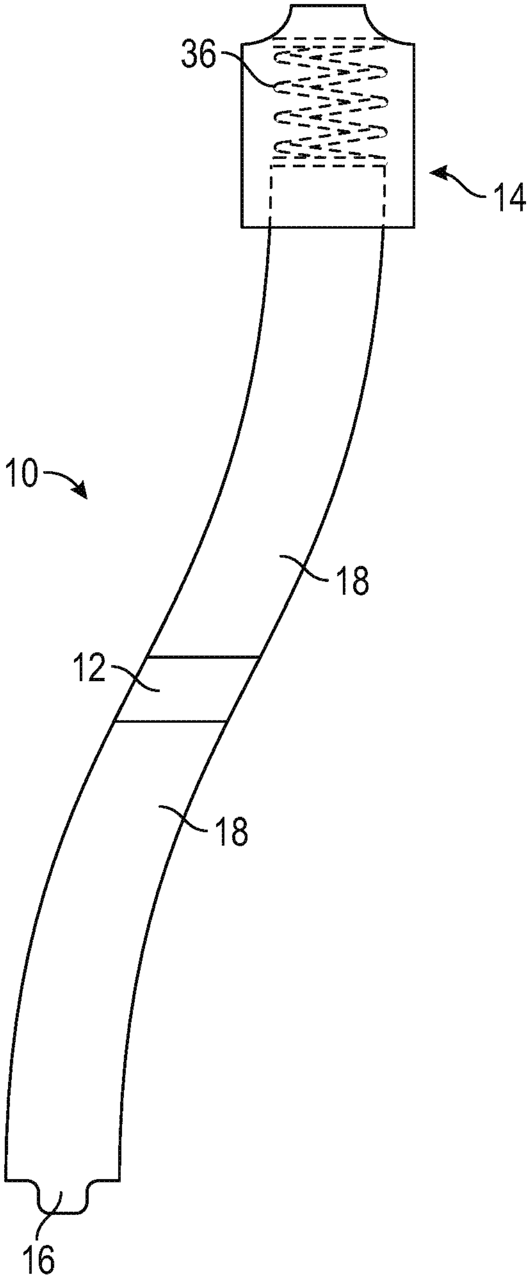
FIG. 3B is a side view of the assistance device illustrated in FIG. 3A.

Referring to FIGS. 3A and 3B, the assistance device 10 is a spring-loaded assembly having a first vertical support member 18*a* and a second vertical support member 18*b* connected by a foot hold surface 12 wherein the foot hold surface 12 extends horizontally therebetween. Both the first vertical support member 18*a* and the second vertical support member 18*b* have a first mounting surface 14 for frictionally engaging an upper step 30 of the factory stair 34. Moreover, both the first vertical support member 18*a* and the second vertical support member 18*b* have a second mounting surface 16 for frictionally engaging the lower step 32. The first mounting surface 14 includes springs 36 thereon.

As further illustrated in FIG. 3B, the vertical support member 18 includes bends along its length such that the vertical support member 18 is not 180 degrees. The portion of the vertical support member 18 extending above the foot hold surface 12 may bend inward, toward a vehicle, to fit underneath an upper step 30 which may not be as wide as a lower step 32. In addition, the portion of the vertical support member 18 extending below the foot hold surface 12 may bend outward, away from the vehicle, to accommodate a wider lower step 32 and/or to provide more stability for the assistance device 10.

Figure 4:
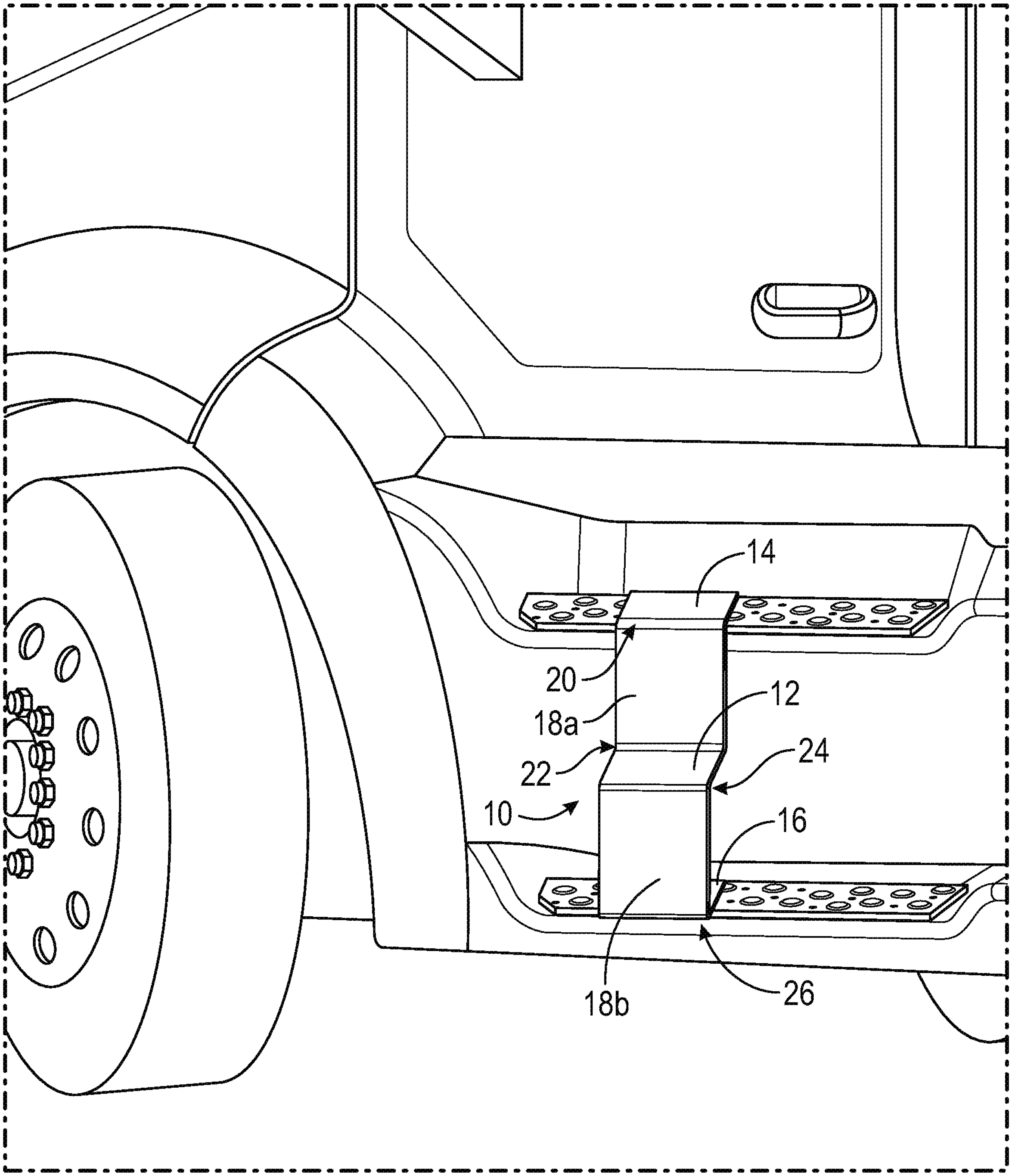
FIG. 4 is a perspective view of an assistance device according to one or more embodiments herein mounted to a factory stair for a truck or trailer.

Referring to FIGS. 4-6, a first vertical support member 18*a* extends from a first mounting surface 14 to a foot hold surface 12 and the second vertical support member 18*b* extends from the foot hold surface 12 to the second mounting surface 16. The first vertical support member 18*a* and the second vertical support member 18*b* meet the foot hold surface 12 on opposite sides.

In one or more embodiments according to FIGS. 4-6, an assistance device 10 is integrally formed and comprises a plurality of bends for defining a foot hold surface 12, a first mounting surface 14, and a second mounting surface 16. Specifically, the assistance device 10 comprises a first bend 20 for connecting the first mounting surface 14 with a vertical support member 18*a* and a second bend 22 configured to connect the vertical support member 18*a* with the foot hold surface 12. Additionally, the assistance device 10 comprises a third bend 24 and fourth bend 26 wherein the third bend 24 is configured to connect the foot hold surface 12 with a second vertical support member 18*b* and the fourth bend 26 is configured to connect the second vertical support member 18*b* to a second mounting surface 16. The one or more bends are about 90 degrees.

As further illustrated in FIGS. 4-6, the assistance device 10 has a first mounting surface 14 and a second mounting surface 16 each extending from opposite sides of a foot hold surface 12. Referring to FIG. 4, the assistance device 10 extends from the upper step 30 to the lower step 32 in the factory stair 34. However, it is also contemplated that the assistance device 10 is securable to one of the upper step 30 or lower step 32 as illustrated in FIGS. 5-6. Referring to FIGS. 5-6, the first mounting surface 14 and second mounting surface 16 comprise one or more apertures 13 therein for securing the device 10 to an upper step 30 or lower step 32. Again, the first mounting surface 14 and second mounting surface 16 may both be securable to a factory step by fasteners such as bolts, screws, etc. The foot hold surface 12 may then extend upward or downward from the lower step 32 or upper step 30, respectively.

Figure 5A:
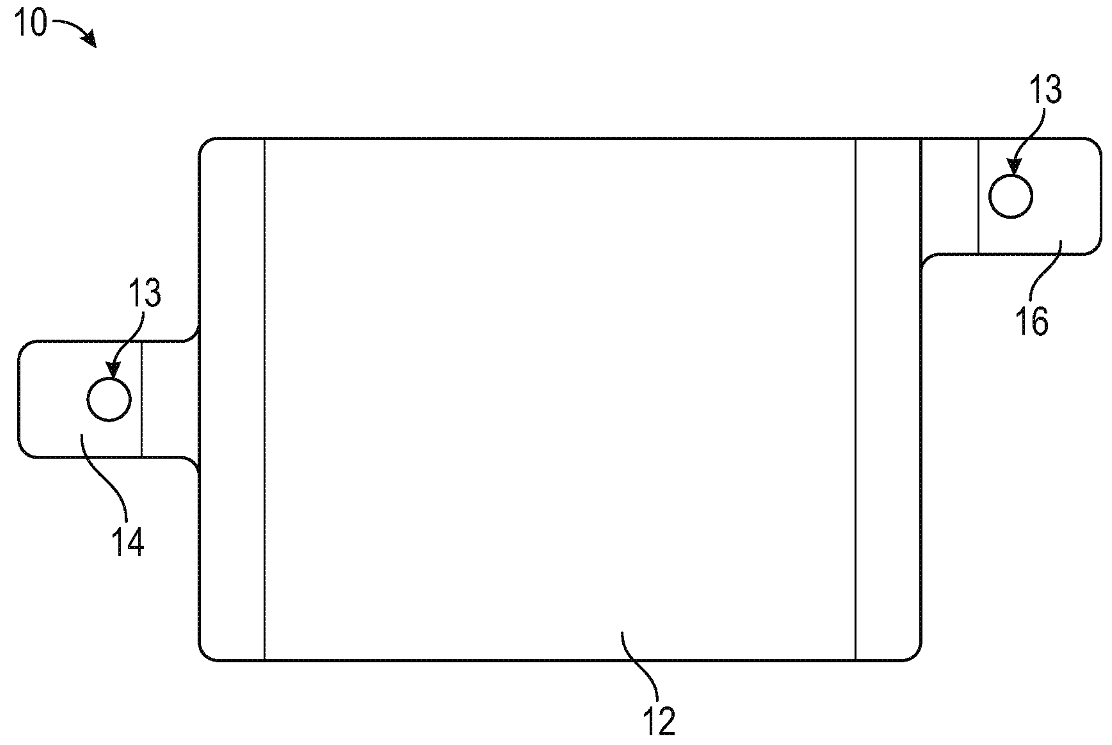
FIG. 5A is a top view of an assistance device according to one or more embodiments herein for mounting to a factory step for a truck or trailer.
Figure 5B:
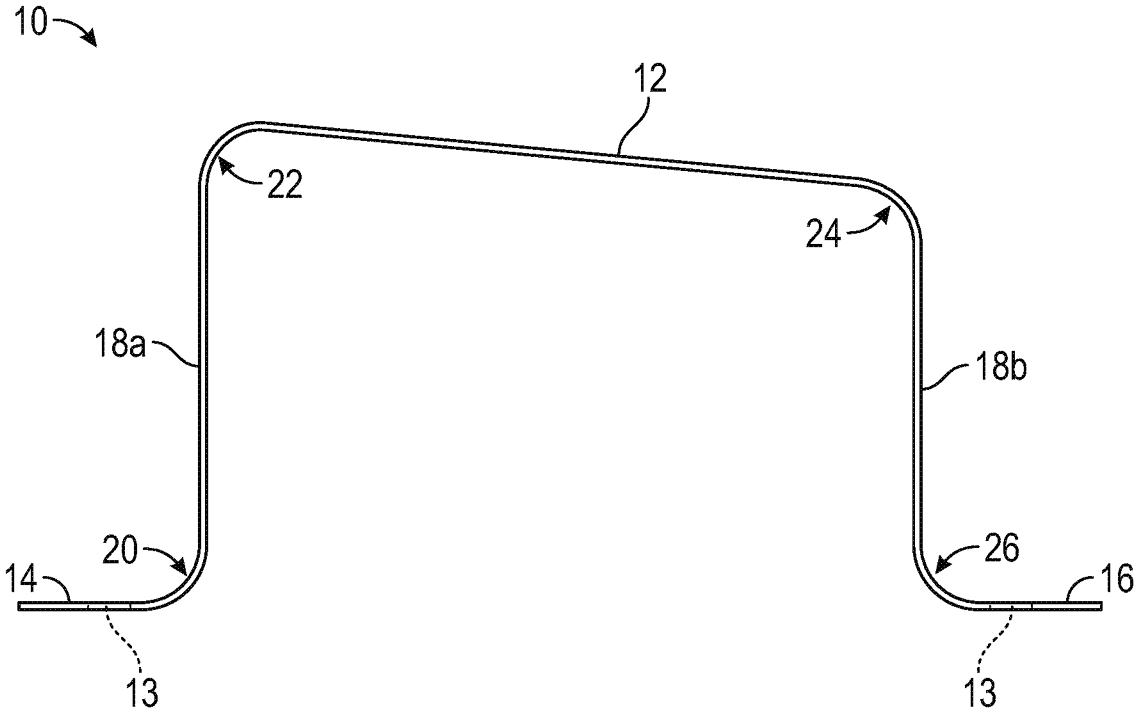
FIG. 5B is a side view of an assistance device as illustrated in FIG. 5A.
Figure 6A:
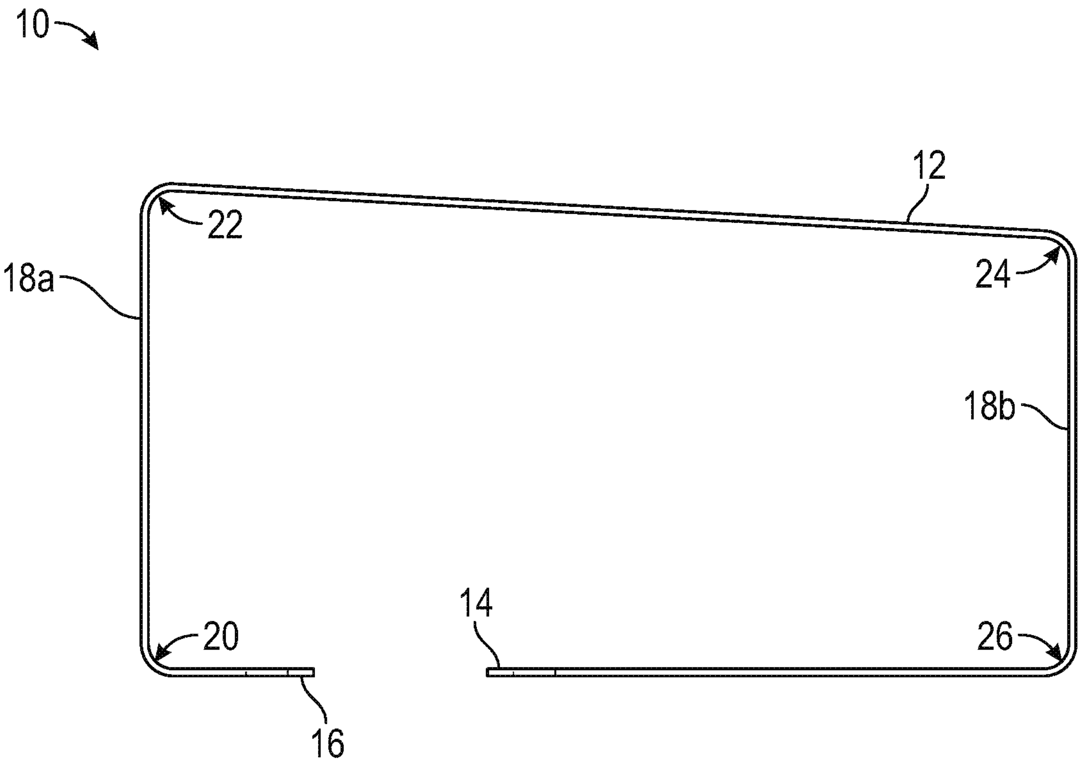
FIG. 6A is a side view of an assistance device according to one or more embodiments herein for mounting to a factory step for a truck or trailer.

As illustrated in FIGS. 5B and 6A, the first vertical support member 18*a* has a longer length than the second vertical support member 18*b* such that the foot hold surface has a slope. The first vertical support member 18*a* may be about 0.1 to 2 inches longer than the second vertical support member 18*b*.

Figure 6B:
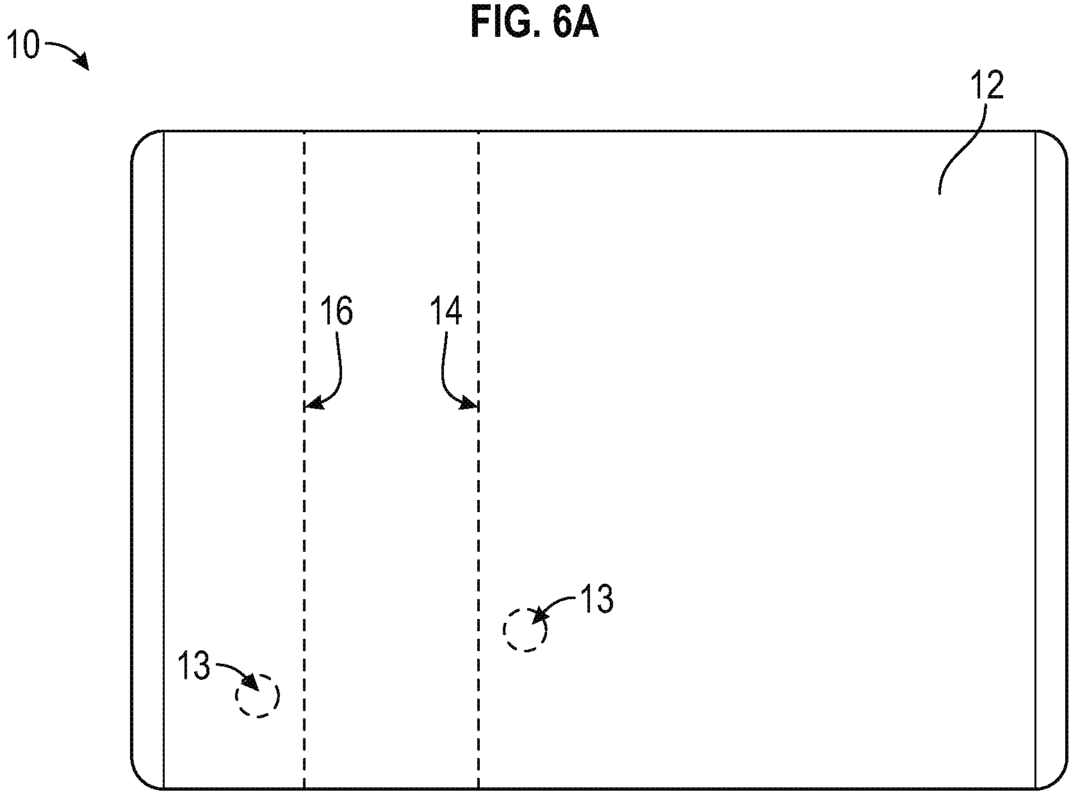
FIG. 6B is a top view of an assistance device as illustrated in FIG. 6A.

As further illustrated in FIG. 5A, the first mounting surface 14 and the second mounting surface 16 are smaller than the foot hold surface 12. The first mounting surface 14 and the second mounting surface 16 are about 1×1 inches and are positioned along the length of the foot hold surface 12. The first mounting surface 14 is positioned about halfway along the length of the foot hold surface 12. Whereas the second mounting surface 16 is positioned at one end of the foot hold surface 12. However, as illustrated in FIG. 6B, the first mounting surface 14 and the second mounting surface 16 have the same length as the foot hold surface 12. Referring to FIGS. 5A and 6B, the first mounting surface 14 and the second mounting surface 16 each comprise an aperture 13 therein for securing the assistance device 10 to a factory step.

While various non-limiting embodiments are illustrated across FIGS. 1-6, one or more of these embodiments or elements of one or more embodiments may be combined to form overall assistance device or assistance device assemblies according to the present disclosure.

Although the present disclosure has been described with reference to preferred embodiments, workers skilled in the art will recognize that changes may be made in form and detail without departing from the spirit and scope of the disclosure.

The invention claimed is:

1. An aftermarket assistance device for mounting to an entry point of a vehicle comprising:

a first end and a second end with at least one vertical support member extending therebetween, wherein the first end comprises a first mounting surface for coupling directly to a first pre-existing step on the vehicle and the second end comprises a second mounting surface for coupling directly to a second pre-existing step on the vehicle and wherein the length of the vertical support member is in the range of about 12 to about 24 inches; and a foot hold surface positioned about halfway between the first end and second end, wherein the entry point of the vehicle comprises pre-existing steps to which the aftermarket assistance device is mountable.

2. The assistance device of claim 1 wherein the foot hold surface, the first mounting surface, and/or the second mounting surface are configured to be bolted or welded to the vertical support member.

3. The assistance device of claim 1 wherein the foot hold surface, the first mounting surface, and/or the second mounting surface are integrally formed with the vertical support member.

4. The assistance device of claim 1 wherein the assistance device comprises a first vertical support member and a second vertical support member, wherein the foot hold surface extends horizontally therebetween.

5. The assistance device of claim 4 wherein the first vertical support member and the second vertical support member intersect at one end each thereof, thereby forming a corner.

6. The assistance device of claim 1 wherein the first mounting surface comprises one or more springs which frictionally engage the vertical support member with the first step.

7. The assistance device of claim 1 wherein the vertical support member comprises one or more bends such that the assistance device remains within a perimeter of a frame of a factory stair by not having a depth that exceeds an outer perimeter of the second step.

8. The assistance device of claim 1 wherein the assistance device is comprised of steel, aluminum, diamond plate steel, or combinations thereof.

9. The assistance device of claim 1 wherein the foot hold surface has a surface area that is less than half of a surface area of either the first or second step or both.

10. The assistance device of claim 1 wherein the foot hold surface has a surface area that is one-third or less than a surface area of the first or second step or both.

11. The assistance device of claim 1 wherein the vehicle is a semi-truck, semi-trailer, truck, or trailer.

12. The assistance device of claim 1 wherein the assistance device is an assistance step.

* * * * *